United States Patent
Lohrmann et al.

(10) Patent No.: US 9,066,534 B2
(45) Date of Patent: Jun. 30, 2015

(54) PROCESS FOR IMPROVING PRODUCTS OF DRY MILLING

(75) Inventors: Troy Lohrmann, Lake Villa, IL (US);
David Paustian, Vinton, IA (US);
Daniel Hammes, Huntley, IL (US);
Zivko Nikolov, College Station, TX (US)

(73) Assignee: Corn Value Products, Kenosha, WI (US)

(*) Notice: Subject to any disclaimer, the term of this patent is extended or adjusted under 35 U.S.C. 154(b) by 1627 days.

(21) Appl. No.: 12/117,621

(22) Filed: May 8, 2008

(65) Prior Publication Data
US 2008/0279983 A1 Nov. 13, 2008

Related U.S. Application Data (60) Provisional application No. 60/917,118, filed on May 10, 2007.

(51) Int. Cl.
*A23L 1/025* (2006.01)
*A23L 1/105* (2006.01)
*A23L 1/10* (2006.01)
*C08B 30/04* (2006.01)

(52) U.S. Cl.
CPC ............ *A23L 1/105* (2013.01); *A23L 1/1041* (2013.01); *C08B 30/04* (2013.01); *C08B 30/042* (2013.01)

(58) Field of Classification Search
USPC ........................................................ 426/481
See application file for complete search history.

(56) References Cited

U.S. PATENT DOCUMENTS

| | | | |
|---|---|---|---|
| 4,181,748 A * | 1/1980 | Chwalek et al. ............... | 426/623 |
| 4,326,036 A | 4/1982 | Hayes et al. | |
| 4,333,611 A | 6/1982 | Zucker et al. | |
| 4,414,330 A | 11/1983 | Zucker et al. | |
| 6,254,914 B1 | 7/2001 | Singh et al. | |
| 6,566,125 B2 | 5/2003 | Johnston et al. | |

(Continued)

FOREIGN PATENT DOCUMENTS

| DE | 2918212 A1 | 11/1980 |
|---|---|---|
| WO | WO2005074704 A1 | 8/2005 |

(Continued)

OTHER PUBLICATIONS

Murthy, Ganti et al. Improvement in fermentation characteristics of degermed ground corn by lipid supplementation. J. Ind Microbiol Biotechnology (2006). Published online Mar. 21, 2006. pp. 655-660.*

(Continued)

*Primary Examiner* — Jenna A Watts
(74) *Attorney, Agent, or Firm* — Patricia A. Sweeney

(57) ABSTRACT

Processes for improving the properties of byproducts of dry milling are described. In one process, fractionated plant seed tissue is soaked such that starch is loosened and washed away in the soaking liquid. A byproduct results that has decreased starch content, and when the byproduct includes germ tissue, has increased oil content. In a process, short soak times and lower temperatures are used as compared to traditional wet milling processes, and results in a byproduct that has both increased protein dispersibility index and increased oil content. Lower pH may further increase oil and protein dispersibility index levels. When a higher pH is used, protein dispersibility increases, regardless of the temperature of the soaking liquid.

32 Claims, 1 Drawing Sheet

(56) References Cited

U.S. PATENT DOCUMENTS

| | | |
|---|---|---|
| 6,740,508 B2 | 5/2004 | Ulrich et al. |
| 6,835,558 B2 | 12/2004 | Van Lengerich et al. |
| 6,899,910 B2 | 5/2005 | Johnston et al. |
| 6,962,722 B2 | 11/2005 | Dawley et al. |
| 7,820,418 B2 | 10/2010 | Karl et al. |
| 7,858,140 B2 | 12/2010 | Paustian et al. |
| 2004/0187863 A1 | 9/2004 | Langhauser |
| 2006/0040024 A1 | 2/2006 | Srinivasan et al. |
| 2006/0251764 A1 | 11/2006 | Abbas et al. |
| 2006/0251791 A1 | 11/2006 | Rubio et al. |
| 2007/0172914 A1* | 7/2007 | Slabbekoorn et al. ....... 435/68.1 |
| 2008/0044547 A1 | 2/2008 | DeLine et al. |
| 2010/0203195 A1 | 8/2010 | Didion |

FOREIGN PATENT DOCUMENTS

| | | |
|---|---|---|
| WO | WO2006004748 A3 | 1/2006 |
| WO | WO2007019176 A2 | 2/2007 |
| WO | WO2007019227 A1 | 2/2007 |
| WO | WO2007131167 A2 | 11/2007 |

OTHER PUBLICATIONS

"Effects of pH". Worthington-biochem.com. Retrieved from web archive, available Mar. 21, 2006. pp. 1-2.*

Singh et al. (2005) "Comparison of modified dry-grind corn processes for fermentation characteristics and DDGS composition" Cereal Chemistry 82(2):187-190.

Singh & Eckhoff, (1996) "Effect of soak time, soak temperature and lactic acid on germ recovery parameters" Cereal Chemistry. 73(6):716-720).

Singh et al. (1999) "Recovery of fiber in the corn dry-grind ethanol process: a feedstock for valuable coproducts" Cereal Chemistry 76(6):868-872.

Singh et al (1995). "Hydrocyclone procedure for starch-protein separation in laboratory wet milling" Cereal Chemistry pp. 344-348.

Dellweg et al. (1988) "Ethanol fermintation: suggestions for process improvements." Process Biochemistry, vol. 23: 100-104.

Singh et al. (2007) Process and Engineering Effects on DDGS Products—Present and Future. Proceedings on the 5th Mid-Atlantic Nutrition conference. Simmermann, N.G., ed., University of Maryland, College Park, MD. p. 82-90.

Murthy et al. (2006) Evaluation and strategies to improve fermentation characteristics of modified dry grind corn processes. Cereal Chem. 83:455-4459.

Noll et al. (2007) Formulating poultry diets with DDGS—how far can we go? Proceedings on the 5th Mid-Atlantic Nutrition conference. Zimmermann, N.G., ed., University of Maryland, College Park, MD. p. 91-98.

Waldroup et al. (2007) Biofuels and Broilders—compeittors or Cooperators? Proceedings on the 5th Mid-Atlantic Nutrition conference. Zimmermann, N.G., ed., University of Maryland, College Park, MD. p. 25-34.

Srinivasan et al. (2006) Economics of Fiber Separation from Distillers Dried Grains with Solubles (DDGS) Using Sieving and Elutriation. Cereal Chem. 83(4): 324-330.

Singh and Eckoff (1997) "Economics of germ preparation for dry-grind ethanol facilities" Cereal Chemistry 74(4): 462-466.

Singh et al. "Modified dry grind ethanol process" Publication of the Agricultural Engineering Dept. U. of Ill., UILU No. 2001-7021, Jul. 18, 2001.

"GrainValue Corn Fractionation Process" www.grainvalue.com, discovered on internet Jun. 2, 2008.

Lohrmann et al. "Using a new modified wet, biorefinery system in an ethanol plant to produce novel food products" 100th AOCS Annual Meeting, May 3-6, 2009, abstract and slides.

Lohrmann et al., "Manufacturing new food co-product(s) using a novel ethanol corn fractionation system" 101st AOCS Annual Meeting, May 16-19, 2010, abstract and slides.

Wilken et al. Process development of high quality protein products using germ wet milling Annual Meeting for Institute of Biological Engineering, Santa Clara, CA Mar. 21, 2009, abstract and slides.

Wilken and Nikolov, "Commercial Opportunities and challenges for protein products from corn" ASABE Meeting, paper 1000002, Jun. 20-23, 2010, paper and slides.

Lin and Zayas, (1987) "Protein solubility, emulsifying stability and capacity of two defatted corn germ proteins" Journal of Food Science, vol. 52, No. 6, pp. 1615-1619.

Lin and Zayas, (1987) "Influence of corn germ protein on yield and quality characteristics of comminuted meat products in a model system" Journal of Food Science, Vo. 52, No. 3, pp. 545-548.

Lin and Zayas, (1987) "Functionality of defatted corn germ proteins in a model system: fat binding capacity and water retention" Journal of Food Science, vol. 52, No. 5, pp. 1308-1311.

Nielsen et al., "Corn germ protein isolated—preliminary studies on preparation and properties" presentation at 32nd Annual Meeting of Institute of Food Technologists, May 1972, American Assoc. of Cereal Chemists. vol. 50, pp. 435-443 1973.

Parris et al. (2006) "protein distribution in commercial wet- and dry-milled corn germ" J. Agric. Food Chem. vol. 54, pp. 4868-4872.

Dickey et al. (1997) "Hydrocyclone separation of dry-milled corn" Cereal chemistry 74(5):676-680.

Pierce (2004) "A revolutionary new food protein/nutraceutical ingredient for the food and beverage industries" Food Marketing & Technology vol. 18, No. 1, pp. 4-6.

Nielsen et al. (1977) "Effect of bound lipid on flavor of protein isolate from corn germ" Cereal Chem. 54(3): 503-510.

* cited by examiner

PROCESS FOR IMPROVING PRODUCTS OF DRY MILLING

REFERENCE TO RELATED APPLICATIONS

This application claims priority to previously filed application U.S. Ser. No. 60/917,118, filed May 10, 2007, the contents of which are incorporated in their entirety.

BACKGROUND

The replacement of fossil fuel as an energy source has led to interest in identifying renewable energy sources. Grain crops and grasses are seen as potentially valuable sources of alternative energy fuels. One such source is the use of crop plants to produce ethanol. An example of one such crop plant is corn, or other grasses and grains used to produce ethanol, typically using either wet milling or dry grinding processes.

In conventional wet milling, whole kernel corn (seed) is steeped in a liquid mixture including sulfur dioxide for a period of between 24 and 36 hours to soften the materials and loosen the components of the kernel. The corn and liquid is put in a mill that grinds the corn to free the germ from the kernel. Germ can be separated from the other materials using known technologies. A unique feature of cleaned germ that is low in starch is that it floats to the top of a starchy soak slurry and can be separated from other materials. The remaining starch, protein and fiber are separated to produce pure starch. The starch is cooked and fermented, and finally distilled to produce ethanol.

In conventional dry grind ethanol production, corn seed is ground, mixed with water, cooked, fermented with yeast, and distilled. The pericarp fiber (bran) and germ do not ferment and instead at the end of the process are produced as solids. These byproduct solids are commonly dried to 10% moisture and called distillers dried grains with solubles, also referred to as DDGS.

Conventional dry milling for food uses may also occur separate from ethanol production, where grain is ground so that the pericarp and germ are separated from the endosperm. The endosperm proceeds through and can be used for any of a variety of food or beverage applications, while the pericarp and germ may or may not be separated from one another and sold as a low value livestock feed ingredient.

An important aspect of increasing the feasibility of ethanol production is to optimize use of the byproducts produced in this process. High raw material expense and costs of bringing the raw material to plants, the cost of enzymes, yeast and chemicals used in the process, and capital and labor costs are limitations on economics of ethanol production. In the dry-grind process, no distinction is made between the fermentable starch and non-fermentable components of the seed, namely the germ, fiber and protein. These components are recovered together as DDGS post fermentation and sold at a discounted price to corn due to excess market supply and poor handling characteristics. There is keen interest in improvement in purity of these components and removing them prior to ethanol fermentation, in order that they may be sold for separate higher value uses and improve the economics of the operation.

New ethanol pre-processing technologies termed "fractionation or frac" are under development. One processing technology incorporates or combines the germ and pericarp removal processes common in conventional food dry-milling with the conventional dry-grind ethanol process to grind the seed before steeping to create a higher purity starch stream to enhance ethanol efficiencies. One limitation of the dry frac for ethanol process is the loss of starch with the germ and pericarp removal which lowers the quality of the germ and pericarp while also lowering the ethanol yield per bushel of corn processed.

In corn seed a majority of the oil is concentrated in the germ tissue. Corn oil has been traditionally removed from the germ using hexane solvent extraction processes. A very large percentage of this germ is produced and extracted by the conventional corn wet milling industry. Standards for corn germ have been developed over many years based on the corn wet milling industry. Corn germ that is desirable for extraction must be greater than 35% oil dry matter basis (dmb) and less than 5.0% moisture. To date this has not been achievable with germ produced by dry milling processes. Currently germ produced in a dry milling process has about 20-25% oil content (as is basis).

TABLE 1

Typical composition of Dry-Milling Byproducts Streams (as is basis)

| Component (%) | corn germ | corn bran | hominy feed[1] | corn |
|---|---|---|---|---|
| Moisture | 9.6 | 10.0 | 13.5 | 14.0 |
| Protein | 15.8 | 8.0 | 8.0 | 11.0 |
| Fat | 23.8 | 4.5 | 3.4 | 4.5 |
| Crude Fiber | 5.7 | 12.0 | 4.7 | 2.5 |
| Ash | 6.7 | 2.5 | 2.0 | 2.0 |
| Starch | 18.4 | 35.0 | 61.0 | 60.0 |
| Other polysaccharides | 20.0 | 28.0 | 7.4 | 6.0 |

Alexander, 1987.
[1]Feedstuffs. Reference Issue. 2007.

The germ that is removed using the conventional dry fractionation processes suffers from low oil concentrations, as well as high starch and moisture content. Currently, the conventional wet milling industry uses only whole kernel and discriminates against broken corn pieces. If one were to use this dry fractionated material(s) in a conventional wet milling operation, a serious complication is tank foaming during the soak or steeping phase. In addition, yield loss would be observed for oil extraction processing because of the high residual starch levels, making dry milled germ an undesirable feed stock. This is because the loose starch material restricts hexane circulation by fouling pumps. Ethanol or dry milling plants producing dry fractionated germ in this fashion are often forced to sell this material into the low value animal feed market. In contrast, high purity wet-milled germ has a value significantly higher since it is further processed into edible oil for human consumption. Additionally, the high starch content of dry fractionation germ reduces the amount of starch available for fermentation, resulting in lower ethanol plant yields and reducing profitability. S. A Matz (1991) reports that the process of extracting oil is not efficient if the germ contains 'significant' amounts of foreign material (eg starch). It is therefore essential to 'carefully' clean the germ fraction.

Further, no product to date produced from such a conventional wet or dry milling process has both high oil purity and high protein dispersiblity index or PDI. The latter measures the percentage of total protein that is soluble in water. Higher oil content of germ fractions is desirable, as is high PDI. A high PDI value improves processing yields which in turn lowers overall manufacturing costs. The corn protein extracted can be used in human consumption as a replacement for expensive animal based protein foodstuffs, beverages cosmetics or pharmaceuticals.

The pericarp that is removed by conventional dry fractionation is limited in food applications due to excess starch levels which further reduces ethanol yields. Higher corn costs that result from increased ethanol production make this problem even greater. Recent changes to the FDA Food Pyramid guidelines suggest the need for increased levels of daily fiber intake. Beyond being low in fat, rich in vitamins and minerals, corn bran is a concentrated source of dietary fiber, not starch and sugars. Refined corn bran is discussed in the literature as being insoluble and having 18% cellulose and 67% hemicellulose and a water-holding capacity of about 2.4:1 (Burge and Duensing, 1989). Food manufacturers are therefore interested in utilizing new ingredients that are high in total dietary fiber (TDF) and consistent. Conventional dry milled fiber would have issues in this regard in that it is difficult to control the amount of starch that remains attached to the fiber without adding expense of further mechanical processing or polishing. Food products containing dry milled corn bran would therefore have varying levels of starch. This in turn would deteriorate the products' consistency, manufacturing processes and increase the risk of falling outside of product nutrient label guarantees. Depending on the food application, corn bran is processed and sized to meet specific granulation requirements. Coarse granulation bran is used in extruded products and ready to eat cereals High fiber baked goods, low-calorie sports drinks and soluble mixes would use bran from a fine mesh sort.

Freeman (1973) and Wang and Eckhoff (2000) discuss that the conventional corn wet milling industry has specific needs of corn quality for processing. Processors work to minimize handling, shipping and conveying to reduce the chance of kernel breakage. Freeman points out that broken pieces of corn (eg starch germ or starch fiber pieces) must be removed by screening before processing as they interfere with the flow of the steeping medium. This is because the sloughed off starch, sugars and protein from the broken pieces enter the steepwater and cause gelling during evaporation of steepwater. In turn, gelling increases steep-liquor viscosity and restricts water flow through the steeps and screens, increasing equipment wear.

The broken pieces of corn are cleaned or aspirated off prior to entering the soak or steep process and are added back to the corn gluten feed, which is a low value feed ingredient compared to refined germ or corn gluten meal. Thus wet millers impose a high discount to discourage delivery of corn that may contain damaged or broken corn. In the book *Corn: Chemistry and Technology*, $2^{nd}$ ed, the authors elaborate the wet millers prefer whole kernel corn which has minimal cracks and broken material. This is preferred since less starch would then wind up in the steep water.

Previously researchers have evaluated the concept of merging conventional dry milling and conventional wet milling operations to create greater efficiencies (Gillenwater et al, 1970, Powell and McGeorge and Chwalek and Olson, 1980). Germ and bran are separated from endosperm. The endosperm 'grits' are then put into a wet steeping process and a thus termed steeping grits. It was noted that in the conventional dry milling process, the germ gets damaged and contaminates the purity of the steeping grits. Because germ contains oil, the authors note that oil causes downstream problems. This hybrid process which attempts to combine conventional dry and wet milling processes is not practical with dry milled germ as one of the substrates. A benefit claimed by the authors of their hybrid wet-dry process is that they do not need the degermination mills, germ separators, germ dryers, and the screens and presses required to wash and de-water the germ and hulls in addition to other expensive apparatuses are eliminated. This is accomplished by removing the hull and germ from the corn kernel before the steeping step.

Attempts made to improve on conventional wet milling product recovery include that described in Slabbekoorn et al, in WO2005/074704. (This reference and all references cited are incorporated herein by reference). The process uses whole corn in a wet milling process for the purpose of concentrating corn gluten. There, corn gluten, that is, the water insoluble proteins derived from the endosperm, is used as a corn protein material produced in a wet milling process. This material is contacted with a wet mill stream produced in the wet milling process (such as corn steep liquor) along with an enzyme to aid in removing carbohydrates. This wet process produces starch liquids separate from the zein proteins, used for corn sweeteners and the like, and a concentrated corn gluten protein product. In the wet milling process, a high quality germ is already produced, and the previous attempts have been focused on improving gluten byproduct as a protein source.

In the conventional dry-milling process, as described here, removal of the zein proteins from starch is not necessary. Instead, it is the fiber, germ and/or hominy that is produced in conventional dry milling that is ordinarily a low-value product that is desired to be transformed into valuable byproducts of dry milling. Attempts to improve recovery of byproducts have included steps to recover germ separately, such as where the whole kernel is soaked prior to degermination and before proceeding with ethanol process, and/or to recover pericarp separately, by separating pericarp following soaking. See for example Singh et al., U.S. Pat. No. 6,254,914. Also see pending application U.S. Ser. No. 11/653,562, published as US20070184159 for an approach where the components are soaked and ground such that hydraulic lift is used to separate the components.

Therefore there is a need to improve the quality and purity of the byproducts of the conventional dry milling processes.

SUMMARY OF THE INVENTION

The invention is directed to improved byproducts from dry milling processes. Plant seed is fractionated using dry milling processes such that seed tissues are separated into fractionated tissue. The fractionated tissue is soaked until starch bonds are loosened and the loosened starch is moved into the liquid, resulting in fractionated tissue with reduced starch content, and where the fractionated tissue comprises germ tissue, also has increased oil content. One embodiment provides the starch content is less than 14%, and another that the oil content is at least about 30%, and in another embodiment is at least about 35%. In another embodiment, fractionated tissue is soaked in a liquid for less than 15 hours at a temperature of less than about 140° F. to produce a germ byproduct having increased oil content. When compared to conventional wet milled germ, this tissue will also have an increased protein dispersibility index. Use of low pH is used in one embodiment for further improvements. In another embodiment a high pH allows the use of higher temperatures while providing for improved protein dispersibility index.

DESCRIPTION OF EMBODIMENTS OF THE INVENTION

The process termed 'dry frac wet milling' is directed to processes that improves the quality and purity of the byproducts of dry milling and dry fractionation ethanol processes.

Starch content and soluble nutrients of fractionated tissue is reduced, and in particular, starch of bran is reduced, and starch content of germ tissue is reduced from this invention, along with increasing oil purity of germ and/or total dietary level of bran.

Further, in another embodiment, by soaking seed tissue fractions comprising germ tissue in a liquid for a shorter period of time and at a lower temperature than is ordinarily used in a conventional wet milling process, it is possible to produce fractionated tissue having both increased oil content and increased protein dispersiblity index (PDI). Use of a higher or lower soak water pH may further improve PDI of the byproduct as well.

The process can be used with the products of a dry milling process, whether it is conventional dry milling producing corn grits and other food and feed grade products, or could be used with an ethanol process combined with a dry fractionation step, or with any facility using starches and sugars as feedstock. For example, the process could be used as a separate facility where starch-containing low value germ and/or fiber and pericarp is brought to the plant for processing to produce higher value product; or could be used as a part of an ethanol plant, where increased value byproducts are produced prior to using the starch in the ethanol production.

The current invention can be applied to all grains with a seed coat, germ and endosperm, in which the fractionated tissue can be produced. It is particularly useful in an embodiment where non-endosperm tissue is separated from endosperm tissue. For example, the cellulosic seed coat can be cleanly separated from a starchy endosperm in large pieces and have naturally occurring differences in density useful for one type of separation process. Examples of these include, but are not limited to, corn, wheat, sorghum, rice, barley, rye, oats and amaranth. The current invention can be applied to any grain or oilseed crop with a low-starch fraction such as a germ or pericarp, in which the low-starch fraction is removed but still contains a significant (greater than 14%) amount of starch. Examples, without intending to be limited, include hominy feed or wheat midds.

The invention results in lowered starch content of the fractionated non-endosperm tissue of such plants following dry milling or dry fractionation (frac). Such processes usually result in significant amounts of starch in fractionated non-endosperm tissue. As discussed further herein, this is usually starch content of more than 14% in germ, bran, hominy wheat midds and other fractionated tissue. (See Table 1 for example)

Grain consists of a seed coat, which is an outer layer, sometimes also referred to in the milling industry as pericarp, or bran or fiber, which terms have been used interchangeably in the industry and herein. Endosperm is the starchy tissue of the grain as well as containing a majority of the zein protein fraction. It is sometimes referred to as grits in the industry. The embryo in the industry is also referred to at times as the germ, and is higher in oil content than the other components of the grain as shown in Table 1 and 2. Hominy is a term referring to a mixture of dry milled or dry frac germ and bran.

TABLE 2

Typical germ composition from the corn kernel and two typical processing methods (%, dry matter basis).

|  | Native germ[1] | Dry mill or Dry frac germ[2] | Wet milled germ[2] |
|---|---|---|---|
| Oil | 33.2 | 22.3 | 48.7 |
| Starch | 8.3 | 26.5 | 11.3 |
| Protein | 18.4 | 18.3 | 13.4 |

TABLE 2-continued

Typical germ composition from the corn kernel and two typical processing methods (%, dry matter basis).

|  | Native germ[1] | Dry mill or Dry frac germ[2] | Wet milled germ[2] |
|---|---|---|---|
| Ash | 10.5 | 7.7 | 1.3 |
| Sugars | 10.8 | 10.7 | 2.4 |

[1]Corn Chemistry and Technology p. 61, Table II: Weight and Composition of Component Parts of Dent Corn Kernels from Seven Midwest Hybrids.
[2]Quality Technology Inc. survey data The fiber and germ produced through conventional dry milling and dry grind ethanol fractionation processes are typically lower in oil than native germ due to the high (>14% as is basis) amounts of starch (Alexander, 1987) plus other soluble nutrients such as sugars, protein and ash. Conventional wet milled germ is higher in oil content than native germ due to the solubilization (during the soak process) and removal (further processing) of nutrients such as starch, protein, ash and sugar. Removal of these nutrients results in a concentration of oil and a final content higher than either native or dry milled germ.

In using the term byproduct is meant fiber, germ, hominy, or other byproduct of the dry grinding or dry milling processes, or a combination, produced through such processes. Improving the quantity, purity and usefulness of these byproducts is one advantage of the current process. In the industry dry milling refers to separation of tissue of seed and is a term commonly used in a process that produces feed or food products; dry grind is a term commonly used where seed is ground before steeping and being sent through an ethanol process; and wet milling steeps whole kernel which is then ground, and in the dry frac version of wet milling germ and pericarp are separated prior to steeping. Here, when referring to "dry milling fractionation" is meant the separation of seed into fractions of tissue, regardless of whether the separation occurs as a result of dry milling, dry grind, or any other type of fractionation. When referring to fractionated tissue is meant to refer to the tissue resulting from such processes, in which seed tissue is separated into different fractions or pieces. The fractionated tissue that is soaked can be discreet segments, such as non-endosperm tissue, germ tissue, pericarp tissue, ground seed, or the like, or any combination of any of these. The fractions can be added to whole kernel seed soak, and benefit will still be obtained in producing fractions with improved properties when soaking the fractions according to the invention.

In the dry milling fractionation process in which the invention may be employed, the pericarp and/or germ is separated from the endosperm in an embodiment. One skilled in the art will appreciate there are various methods to separate the pericarp and/or germ from the endosperm. Soaking of the corn to loosen the grain components from one another is an optional step prior to grinding. In one example, with alkali debranning, the kernel is soaked in a hydroxide solution so that the connecting tissue between the endosperm and pericarp is loosened, and either a mechanical or other force on the kernels separates the pericarp from the kernel. In another example, the corn may be processed as with conventional dry milling, where a degerminator strips the pericarp and germ away from the endosperm. The endosperm proceeds through the degerminator separately from the pericarp and germ.

The pericarp and germ may or may not be subject to further separation. There are a number of variations available in separating these components. Another process is described at US Application Publication No. 20070184159, where kernels are processed such that flakes of pericarp are produced that are thinner and flatter than horny endosperm particles, larger than fiber produced through conventional wet milling, and have lower density than the horny endosperm particles that are also present in the solids fractions after germ removal. The entire seed is soaked in liquid without the use of sulfur compounds, preferably from about six to 24 hours and preferably at a temperature of about 140° F. to 160° F. Germ is removed through conventional wet milling methods, followed by fiber removal which can be separated by movement of a liquid slurry of the particles resulting in hydraulic lift of the flakes.

Other possible separation processes may include the use of sizing screens after the starch has been dissolved from the germ in water with one or a combination of water temperature, enzymes, grinding or roller mills. After drying the germ, any remaining fiber could be removed from the germ/fiber mixture and separated after drying with aspiration. The specific means employed to separate germ and/or fiber from the endosperm are not critical and variations in the procedures are available to one skilled in the arts.

After dry milling fractionation, the endosperm can be used as a source of starch for fermentation such as ethanol production, or food and industrial applications that currently rely on a starch stream. The remaining germ and fiber from dry milling fractionation typically will have considerable starch still clinging to the components. (See Table 2) By reducing the starch content of the fractionated tissue, this invention enables the production of low-starch germ (and thus higher oil content) and low-starch fiber (with higher total dietary fiber content) and other low-starch fractionated tissue, following dry milling fractionation similar to that which can be achieved from wet milling or wet fractionation. Soaking the tissue aids in loosening the bonds of the starch to the tissue, and aids in washing it off the tissue. Furthermore, the soaking process also solubilizes other components such as sugars, ash and soluble proteins which further improve the purity of oil in the germ or total dietary fiber in the pericarp. Means to increasing the oil concentration in germ include leaching during the soak process any one, some or all of the of the soluble components and nutrients starch, sugar, fiber, moisture, protein, phosphorus and ash (White P. J. and Johnson, L. A., 2003). Such processes have been used to soak whole corn, but have caused problems for wet millers, as described supra, with starch loss in the steep water thickening or gelling, and have not been used with dry fractionated pieces and particularly with non-endosperm pieces. Here, the inventors have found use of the process in the invention further improves oil concentration of germ. It is believed these soluble nutrients behave as a diluent, and reduce the final concentration of oil found in the germ. The process of soaking or washing the germ releases and removes these diluting nutrients from the germ into the soak water. The germ is then separated from the soak water by procedures available to one skilled in the art. The soak water can enter into the fermenter where the starch and sugars are converted to ethanol and the soluble proteins are utilized by the yeast organisms as a nutritive substrate. When the tissue is germ, having some water soluble nutrients removed will result in significantly higher level of oil and is more desirable as a oil crushing substrate.

In one embodiment of this invention, the seed tissue is fractionated by any one of the methods described. The fractionated tissue is soaked until the starch is hydrated and bonds to the germ weakened. In an embodiment of the invention the germ is soaked in water or other liquid such as, but not limited to backset or recycled cook water, at a temperature of 33° F. up to 180° F., and in preferred embodiments is at least ambient room temperature, or about 55° F. up to about 180° F., for at least 30 minutes. The use of ambient room temperature water will be a processing cost savings compared to using water that is heated or chilled. In one preferred embodiment the temperature range is from about 120° F. to about 180° F., and in another embodiment will be about 140° F. to about 160° F., which will aid in removing starch, while also reducing the possibility of bacterial or other contaminants. In yet another embodiment, an enzyme such as a carbohydrase may be added to the soak water to aid in removal of bound starch. Examples of such enzymes include amylo-glucosidases which convert oligosaccharides to individual glucose molecules; proteases which break down protein structure; and cellulases. Other enzymes may be added in combination with alpha amylase or separately, but not limited to include: a hemi cellulase, pullulanase, glucoamylase, dextrinase, phytase, lipase or pectinases.

In one embodiment, such an enzyme can be an alpha amylase enzyme. Adding an enzyme is expected to achieve disruption of the starch linking bonds with less soak time, expected to be between about two to 12 hours.

In an additional optional embodiment, sulfur dioxide may be added to the soaking liquid. Adding the optional sulfur dioxide can further reduce the possibility of contamination and further aid in separating the starch from the germ. When soaked with sulfur dioxide, it is expected the disruption of the sulfur bonds can be achieved at a lower temperature, while also avoiding contamination, and thus would be achieved using temperatures of about 120° F. to about 125° F.

Following soaking to achieve hydration and disruption of the sulfur bonds, in one embodiment any residual starch is further removed through physical manipulation. The type of device used is not critical, and any device available to one skilled in the art providing for further removal of starch is useful with the invention. Examples include use of the turbulence and tumbling of a gravity screen, or the blunt force of a specialized piece of equipment such as a Bauer Mill, use of an impact degerminator, or roller mill before or after soaking. Impact degerminators, by way of another examples, also referred to as "entoleters" would be used in the present invention and in an embodiment used with the soaked germ and/or fiber. The soaked tissue is thrown at high speed against the side of a mill and broken apart. The soaked germ and/or fiber is loose and flexible, where the starch is not and thus will fall off. Endosperm tissue that is still clinging to the germ and/or fiber may also be removed during soaking with the aid of blunt force from paddles or agitation during the soak process.

In further embodiments, the germ is dewatered via various available physical processes, such as use of a germ press, decanter centrifuge or paddle screen to remove moisture. This step can reduce expenses in the process, by mechanically removing water prior to drying. Typically, after water has been mechanically removed by pressing the germ, the materials may be dried to lower moisture via the use of, but not limited to, a rotary steam tube or fluid bed drier. The steps may be repeated. Residual starch is thus removed from the outside of the tissue particles and oil concentration increased. In one embodiment of the invention the de-watering process reduces moisture to about 50%. In another embodiment of the invention the tissue then proceeds to a dryer where it is dried to a moisture content less than 10% and in one embodiment is dried to about 5% or less and in another embodiment is about 4% or less moisture content. By the use of this invention, fractionated tissue starch content decreases from greater than 14% (as is basis) to less than 14%, less than about 12%, less than about 11% and less than about 10% (as is basis). In a preferred embodiment the germ product has a starch content of about 6 to 8% (as is basis) or less.

The process has been demonstrated to improve oil content of the resulting germ product to at about 30% or about 35% or greater (dmb), and with a moisture content of less than about 5%. In a preferred embodiment the germ product has an oil content of about 30% (dmb) and a moisture content of less than about 5%.

The foregoing can further be used to increase concentration of total dietary fiber in milled bran and/or bran in hominy as well. The amount of residual starch in the fiber or hominy feed would decrease from greater than 50% percent of the product (dry matter basis) to less than 14 percent, less than 12 percent, less than 11 percent and less than 10 percent starch dry matter basis. The method used to determine starch is the Corn Refiners Association (method G-28) used commonly in the wet milling industry. In this method, starch is solubilized by boiling the sample in aqueous calcium chloride. Aqueous alcohol is used in a preliminary extraction step to remove interfering substances, and treatment of the calcium chloride extract with a suitable precipitant. Starch content is measured for optical activity using a polarimeter.

Using the process as described in the process above, which we term here "dry frac wet milling," produces a fractionated byproduct of dry milling having reduced starch and germ with decreased starch and increased oil content of at least about 30%, or at least about 35% or at least about 55% (dmb) is produced. This contrasts with conventional wet milling which uses the whole kernel, rather than fractions, combined with a longer soak of more than 20 hours and typically at least 24 hours, at high temperature of 120° F. and higher and low pH of less than 5, a process which the conventional wet milling industry has found reduces or dissolves the proteins which are inherently bonded to starch particles in native grains. With the conventional wet mill process, oil content is about 44% and PDI about 26% or lower as evidence by the table below. (Sample A and A-4 of the wet milling processes referred to in the table below are from two different facilities.) Dry milling mechanically produces tissue fractions from whole kernel without the use of water, producing a high PDI germ of about 45% and up and a low oil product of about 24% or less.

TABLE 3

Analytical survey of germ from conventional wet milled corn grain (as is basis).

| Analysis, % | HydroMilling ™ Process | Conventional Wet Milled Germ, Processor A | Conventional Wet Milled Germ, Processor A-4 | Traditional Dry Mill Germ |
|---|---|---|---|---|
| Protein | 14.9 | 12.8 | 12.8 | 16.4 |
| Moisture | 5.1 | 4.7 | 4.4 | 10.6 |
| oil | 44.5 | 46.4 | 48.4 | 19.9 |
| Starch | 8.8 | 10.8 | 10.2 | 23.7 |
| PDI | 26.3 | 26.0 | 23.5 | 58.3 |

Using the dry frac wet milling process described above, dry milled fractions of plant seed are used, which produce a byproduct with reduced starch content and germ which also has an increased oil concentration. Germ oil concentration is at least about 30% or at least about 35% (dmb) or higher, producing a valuable high oil byproduct that was originated as a cheap byproduct from the conventional dry milling process.

In yet another embodiment, the inventors have found it is possible to produce a product from dry milling that has both high oil and high PDI. This new dry frac wet milling process described above produces a high oil byproduct, but one with relatively low PDI of less than about 27%. With further novel modifications to our soaking process, germ protein loss and PDI damage can be minimized while retaining high oil content. With this enhanced soak process, a shorter soak time and/or lower soak temperatures are used to produce a byproduct having at least about 30% oil or higher, as well as at least 30% and at least 40% PDI. When producing this type of byproduct is the goal, it may be used in human consumption, thus greatly increasing the value of such a byproduct.

These shorter soak time and temperature conditions include soaking the fractionated tissue comprising germ in a liquid for less than 15 hours at a temperature of less than 140° F. In further preferred embodiments, the tissue is soaked for no more than four hours, in one embodiment from about one to about four hours, in a further embodiment about 30 minutes, and can even produce good results when soaked for less than thirty minutes. Exposure of the attached starch particles to liquid through a short steam treatment process for 30 seconds followed by water wash and Bauer Mill grinding is expected to be sufficient soak time. The temperature used is less than 140° F., in another embodiment is less than 120° F., and in a preferred embodiment is ambient room temperature. Room temperature can, of course, vary from one situation to another, but typically is within the range of about 55° F. to about 80° F.; however, the room temperature of the liquid used could be even cooler. For example, if tap water were used, it can be cooler, at about 55° F. When referring to room temperature here is meant the temperature of the liquid at ambient temperatures. Cooler temperatures can be used as long as one has the water chilling equipment and insulated holding tanks to maintain water temperature cost effectively. The pH of the liquid is often not of importance, and various ranges of pH may be used to achieve the result of high oil and high PDI product. However, still further improvements in oil and PDI content may be found when using lower pH of less than about 6. In an embodiment the pH may be about 3 to about 5.

Further, it is possible to use a higher pH of 9 or more and yet improve PDI values which increase about 17% or more from the original level of dry milled byproduct. Such a process using higher pH increases PDI even at higher temperatures of 140° F. and more, where otherwise an increase in PDI is not seen. In an embodiment the soak time may be less than 20 hours, may be less than 15 hours, may be less than eight hours, may be less than four hours, may be less than two hours, and at least about 30 minutes, with improved PDI.

One skilled in the art would typically use higher temperature and longer soaking or steeping with low pH to enhance whole kernel hydration, and when using sulfur dioxide, as is commonly required with conventional wet milling to increase dissolution of the protein matrix surrounding the starch granule. Further, low pH and high temperatures are expected to inhibit microbial growth, which can be a problem with soaking at longer periods. However, the inventors here have discovered they can use dry milled fractions (pieces of whole kernels) comprising germ tissue combined with short soak time and low temperature, and, optionally, a low pH, to produce a product not before available from either conventional wet milling or dry milling. When reducing moisture of the fraction, as discussed above, one can then achieve a final product with moisture content of less than 5% or 4% and having the properties so described.

To further improve economies of the process, the process can be used in a facility where water is supplied from ethanol production. In an ethanol plant, so-called "backset" or "cookwater" can used for the soaking liquid of this invention. After the fermentation and distillation steps of the ethanol process, a thin stillage is produced which can contain components that are toxic to yeast and would thus inhibit further ethanol production. The stillage is then evaporated and an anaerobic digester, referred to as a methanator, employs bacteria to destroy the toxic organic material. This resulting stream of liquid is called "cookwater." The water is advanced to the soak tank using level control. This water is again recirculated in the soak tank and advanced to the ethanol plant using level control. The water will recover sugars and starches that can be converted to ethanol in fermentation, improving ethanol yield per bushel of the facility. Any of such water streams used in the ethanol process, in addition to fresh water, have the potential for use as the soaking or washing liquid of the germ and/or fiber and further reduce costs associated with the process.

The process can be applicable to dry fractionated germ, fiber or other fractionated tissue from an ethanol plant. However, dry milled germ or fractionated non-endosperm tissue from conventional dry mills that produce corn grits and other food grade products could be used as a feedstock. The water from this process could be incorporated into conventional dry grind ethanol plants or corn wet milling facilities where evaporator condensate is used as the water source to recover the starch and re-incorporated in the syrup making process. This process could also be incorporated into the water balance of the dry frac wet milling process. In the broadest sense, this process could be added to any facility that uses starches and sugars as a feedstock.

The following is provided by way of exemplification of the invention and is not intended to limit the scope of same.

Example 1

Figure 1:
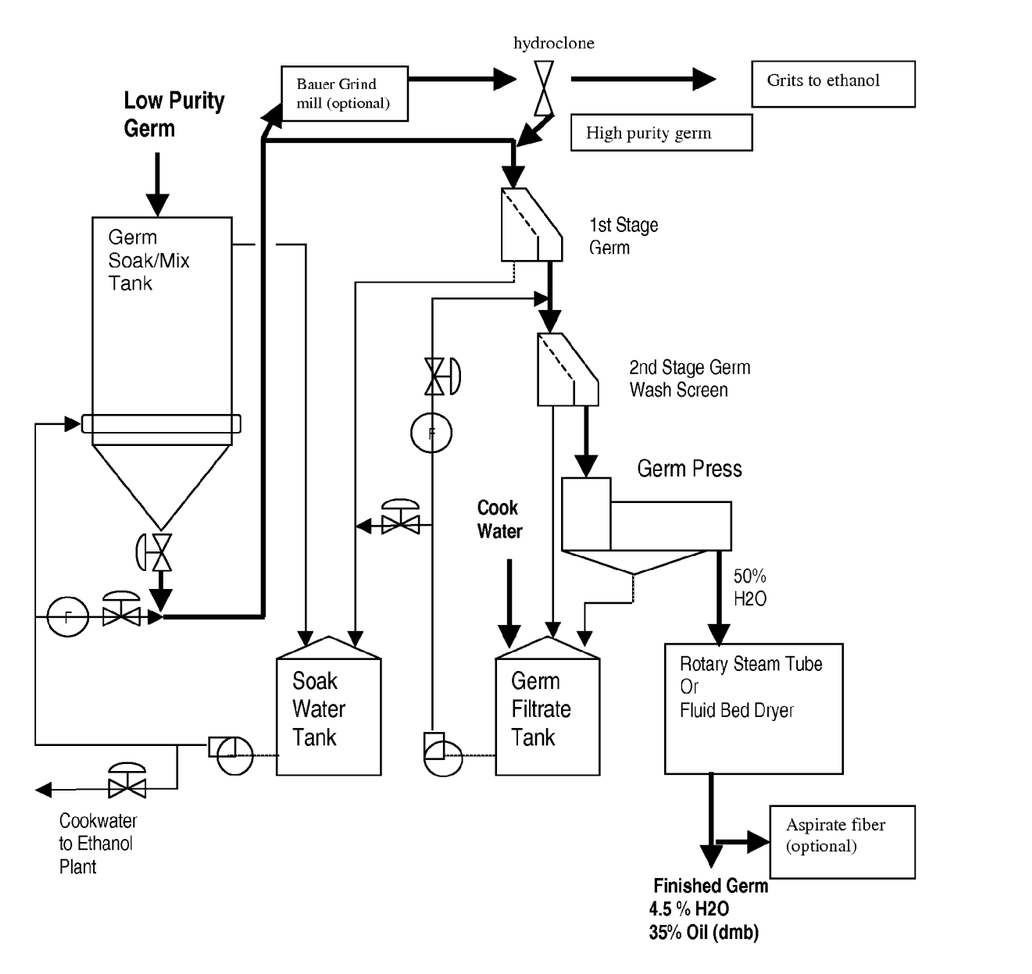
FIG. 1 is a flow chart showing an embodiment of the invention.

In this experiment, commercially available, dry milled germ was utilized to determine the affect of time and water soak temperature on germ oil purity. A water bath was utilized to simulate soak temperatures germ may experience in the soak tank of FIG. 1. Temperature was monitored and adjusted prior to samples being placed. To demonstrate the soak process of the invention as displayed prior in the schematics, dry milled germ was placed in a flask and then filled with tap water and 0.1% alpha amylase and placed in the water bath. Temperatures evaluated included 155° F., 160° F., 165° F. and 170° F. Upon soaking for the allotted time, samples were removed from the bath and the soak water was drained and analyzed. Draining of the soak water in this experiment is similar to the first stage germ wash as described earlier for FIG. 1, whereby soak tank water is removed through screens and remaining material washed. After draining, fresh, clean water was added to the warm germ and given blunt force agitation via the use of a hand mixer for approximately one minute. The hand mixer simulates the commercial use of a Bauer Mill on wet germ post soaking of the invention. This specialized piece of equipment has rotating, blunt blades that strike the pliable, hydrated germ with force and in turn dislodge starch which is still attached to its exterior. By removing additional starch from the germ, oil purity is further improved. After agitation was complete, the germ is rinsed an addition time with fresh water and drained as illustrated earlier with the use of a second stage germ wash. To estimate the amount of 'clean' germ, a solution of water and corn starch is mixed together by formula to conduct a Baumé test. At approximately 10 Baumé, clean germ from this process which has minimal starch (high oil purity), will be less dense than the corn starch solution (at 10 Baumé) and float in the starch solution. Floating germ is then skimmed from the solution, washed and dried using at forced air oven at 160° F. to less than 5% moisture. The materials remaining that do not float (starch pieces, starchy fiber and starchy germ) in the Baumé solution are filtered, and dried by forced air. The dried samples are weighed and along with original dry-milled germ material and analyzed for moisture, crude fiber, crude protein, starch, oil/fat and ash. An aliquot of soak water was retained and held frozen until time of analysis. Results are reported in Table 3. After material dry weights are determined, high oil germ yields (dwb, %) were calculated by the following formula High oil germ yield %=(floating germ, gms)/(floating germ, gms+non-floating material, gms).

A higher germ yield is desired since this is the material that receives a premium in the food-grade oil crush market. Material that doesn't float in Baumé solution is low purity germ and is generally sold at or below prevailing corn price as hominy feed in the animal feed market.

TABLE 4

Analysis of dry milled germ before and the fractions after treatment (%, as is)

| | Soak water temp, F. | Soak time, hrs | Moisture | Crude Protein | Crude fat | Crude fiber | ash | Starch, Ewers |
|---|---|---|---|---|---|---|---|---|
| Commercial Dry Milled germ | | | 9.05 | 14.6 | 21.3 | 5.6 | 6.4 | 24.1 |
| floating germ | 155 | 2 | 2.6 | 18.8 | 34.5 | 8.9 | 62 | 10.7 |
| | | 10 | 2.7 | 17.8 | 35.5 | 6.1 | 6.3 | 10.7 |
| | | 12 | 2.0 | 18.3 | 36.3 | 5.6 | 6.0 | 10.9 |
| | | 24 | 3.1 | 17.7 | 34.1 | 9.1 | 6.1 | 10.9 |
| | 160 | 2 | 1.9 | 18.6 | 34.5 | 5.7 | 6.3 | 10.0 |
| | | 4 | 2.5 | 18.6 | 35.3 | 7.6 | 6.2 | 10.6 |
| | | 6 | 2.5 | 18.3 | 35.1 | 7 | 6.3 | 12.0 |
| | | 8 | 1.7 | 18.3 | 33.00 | 7.1 | 6.1 | 13.8 |
| | 165 | 2 | 1.8 | 18.5 | 32.9 | 7.1 | 6.4 | 13.2 |
| | 170 | 2 | 3.7 | 18.5 | 31.6 | 8.2 | 6.2 | 13.6 |
| non-floating material | 155 | 2 | 2.2 | 13.2 | 18.3 | 3.5 | 3.5 | 45.1 |
| | | 10 | 2.6 | 12.6 | 13.3 | 5.3 | 3.1 | 54.9 |
| | | 12 | 4.5 | 12.7 | 13.4 | 6.3 | 2.9 | 30.5 |
| | | 24 | 5.6 | 11.8 | 12.4 | 3.8 | 2.6 | 50.7 |
| | 160 | 2 | 2.2 | 14.2 | 16.3 | 3.9 | 3.7 | 43.0 |
| | | 4 | 2.3 | 15.2 | 20.4 | 4.6 | 4.2 | 36.9 |
| | | 6 | 2.3 | 10.9 | 4.4 | 3.2 | 1.2 | 64.7 |
| | | 8 | 2.5 | 11.3 | 4.6 | 3.8 | 1.4 | 61.4 |

TABLE 4-continued

Analysis of dry milled germ before and the fractions after treatment (%, as is)

| Soak water temp, F. | Soak time, hrs | Moisture | Crude Protein | Crude fat | Crude fiber | ash | Starch, Ewers |
|---|---|---|---|---|---|---|---|
| 165 | 2 | 2.3 | 11.1 | 4.4 | 3.7 | 1.2 | 63.9 |
| 170 | 2 | 4.1 | 11.3 | 5.2 | 3.7 | 1.5 | 59.5 |

TABLE 5

High purity oil germ yield (%, dwb)

| water temp, F. | soak time, hrs | yield, % |
|---|---|---|
| 155 | 2 | 62.1 |
|  | 10 | 77.1 |
|  | 12 | 73.2 |
|  | 24 | 72.2 |
| 160 | 2 | 76.6 |
|  | 6 | 89.3 |
|  | 8 | 90 |

TABLE 6

Soak water wet chemistry results (%, dmb)

| soak time | sample ID | CP | ash | fat by AH | moisture | starch, Ewers |
|---|---|---|---|---|---|---|
| 2 | trial 3, w-hr soak | 10.6 | 9.5 | 1.4 | 90.5 | 15.0 |
| 4 | Trial 4 soak water | 10.8 | 9.6 | 1.1 | 90.8 | <11.0 |
| 6 | 6 hr soak water | 11.3 | 10.1 | 1.8 | 91.2 | 12.0 |
| 12 | 12 hr first drain | 12.6 | 12.5 | 1.4 | 92.098 | <11.0 |

Results in Table 4 demonstrate the concept of this invention, whereby the oil purity of commercial dry milled germ is significantly increased. The values are improved from approximately 21% to greater than 31%, as shown by the crude fat numbers of the 'floating' germ samples. Oil content (w/w) of 35% and above is further demonstrated when processed using our dry frac wet milling system. With industrial scale equipment, the oil purity of germ from the dry frac wet milling system would be higher since greater levels of starch removal would be observed. The starch removed by this new process from the dry milled germ (starting material) deposits in the non floating particles and the soak water (Table 6), as shown by the elevated starch levels. Also shown by the soak water results are other nutrients that leach from the dry milled germ during soaking such as minerals (ash) and protein. The loss of these nutrients from the dry milled germ during soaking further enhance germ (oil) purity.

Table 5 results reveal that high purity germ yield, is influenced by the time the dry milled byproduct is soaked as well as the water temperature during soaking. Although the lowest soak water temperature and short soak time improve purity compared with the starting material (Table 4), longer times and higher temperatures have the greatest effect on yield.

Example 2

Treatments (Table 8) for this experiment used commercially purchased dry milled germ having the properties set out in the table below.

TABLE 7

Analysis of dry milled germ

| Test (Eurofins) | % | % db |
|---|---|---|
| Moisture | 9.66 | 0 |
| Protein, Kjeldhal | 13.46 | 14.9 |
| Crude Fat | 14.56 | 16.1 |
| Crude Fiber | 3.4 | 3.8 |
| Starch (CRA G-28) | 29.8 | 33.0 |
| PDI | 55.8 | na |

Dry milled germ was soaked in tap water at the respective pH and soak period length to simulate various dry frac wet milling soak conditions. Alpha amylase was added to 60° C. treatments to understand its benefit in this new process. Total soluble protein (TSP) in the soak water was monitored by Bradford throughout the 8 hour soak experiments.

TABLE 8

Soaking conditions that simulate and evaluate various dry frac wet milling conditions.

| pH | temp, C. | time, hr | 0.01% enz |
|---|---|---|---|
| 3 | 25 | 0.5 | — |
| 3 | 25 | 2 | — |
| 3 | 25 | 4 | — |
| 3 | 25 | 8 | — |
| 3 | 60 | 0.5 | — |
| 3 | 60 | 2 | — |
| 3 | 60 | 4 | — |
| 3 | 60 | 8 | — |
| 6 | 25 | 0.5 | — |
| 6 | 25 | 2 | — |
| 6 | 25 | 4 | — |
| 6 | 25 | 8 | — |
| 6 | 60 | 0.5 | — |
| 6 | 60 | 2 | — |
| 6 | 60 | 4 | — |
| 6 | 60 | 8 | — |
| 6 | 60 | 0.5 | y |
| 6 | 60 | 2 | y |
| 6 | 60 | 4 | y |
| 6 | 60 | 8 | y |
| 9 | 25 | 0.5 | — |
| 9 | 25 | 2 | — |
| 9 | 25 | 4 | — |
| 9 | 25 | 8 | — |
| 9 | 60 | 0.5 | — |
| 9 | 60 | 2 | — |
| 9 | 60 | 4 | — |
| 9 | 60 | 8 | — |

At the end of the soak period, a Bauer mill grind was simulated using an overhead mixer to remove loosened, adhered starch particles from the germ. After grinding, all starting material was placed in 8-9 Baumé starch/water solution. Under these conditions, low density material such as high (oil) purity germ and clean fiber float and the more dense materials such as starchy grit and low purity germ sink. This is a common test conducted in wet mills to determine if the separation of germ from the remaining more dense portions of the corn kernel is achieved. Once the floating materials were recovered with a strainer, they were rinsed, dried, and shipped for analysis. Non-floating material was removed by use of a fine filter which allowed the Baumé water to pass through and trapping solid materials for analysis.

The initial dry milled germ wet chemistry results in Table 7 show that the materials had relatively high starch content. By visual inspection, it appeared that the high level of starch was due to detached grit pieces and thus not all of the starch material was attached to the germ.

It was noted that soaking germ in pH 9 conditions created a color reaction with the fiber or bran that results in a bright orange coloration. It was also noted that for pH 9 the color was darker at higher temperature and also with increasing soak time. In addition, germ recovery at 60° C. and pH 9 was reduced.

TABLE 9

Germ recovery efficiency at different soak temperatures and pH (g recovered/g soaked, dmb)

| Soak time | pH 3 | | pH 6 | | | pH 9 | |
|---|---|---|---|---|---|---|---|
| | RT | 60° C. | RT | 60° C. | 60° C. + enz | RT | 60° C. |
| 0.5 h | 14.4% | 15.3% | 21.1% | 11.1% | 11.6% | 11.9% | 14.1% |
| 2 h | 16.7% | 14.5% | 26.3% | 11.8% | 8.7% | 22.5% | 9.9% |
| 4 h | 25.2% | 14.7% | 22.2% | 11.8% | 12.4% | 20.3% | 7.3% |
| 8 h | 19.7% | 19.3% | 17.8% | 10.5% | 12.6% | 20.9% | 7.1% |

Table 9 results show the amount (g) of germ recovered (floaters) from Baumé 9 soak water as a percent of total starting germ material (g). From larger pilot scale trials, it was found that germ recoveries are higher than observed in the lab-scale experiments. This is likely due to the differences in equipment. Commercially and at the pilot scale level, hydroclones are used to separate low density materials like germ and fiber from grits. From our pilot scale experiments, clean germ recovery yields of 40-50% are common but depend on final germ purity.

From these results, it was not clear whether RT or 60° C. soak conditions were better at pH 3. At pH 6 and 9, room temperature (RT) soak conditions resulted in the highest germ yields. These results are surprising because commercial wet mills use high temperature soak conditions (>50° C.) and germ yield (loss) is carefully monitored. Removing clean germ by flotation therefore may not be indicative of commercial conditions with respect to germ yield. For 60° C. soak conditions, increasing soak time did not improve germ yield significantly. At pH 6 and RT, soak time did not appear to have an impact on germ yield. In addition, germ yield did not improve with the addition of 0.01% amylase, however commercial conditions may be different.

TABLE 10

Fat by acid hydrolysis results for floating, high purity germ material obtained under different soak conditions using the dry frac wet milling system (% dmb)

| Soak time | pH 3 | | pH 6 | | | pH 9 | |
|---|---|---|---|---|---|---|---|
| | RT | 60° C. | RT | 60° C. | 60° C. enzyme | RT | 60° C. |
| 0.5 h | 30.0 | 32.5 | 29.9 | 31.9 | 32.0 | 27.99 | 33.51 |
| 2 h | 29.8 | 36.3 | 31.3 | 33.8 | 33.8 | 31.97 | 35.93 |
| 4 h | 30.2 | 37.5 | 31.4 | 36.9 | 35.3 | 31.27 | 36.67 |
| 8 h | 31.7 | 38.7 | 32.5 | 35.9 | 39.1 | 33.82 | 36.26 |

For pH 3 and 6, increasing soak time at RT did not improve germ oil purity as shown in Table 10. At 60° C., purity improved linearly for pH 3 and 6. Overall, purity was greater with 60° C. soak water temperatures irregardless of soak time.

Except for the 8 hour soak treatment, enzyme addition did not appear to increase purity. Interestingly, germ purity was improved by at least 75% using the novel dry frac wet milling concept. Since initial germ purity was low (~16% oil) in the starting material, resulting oil purities were not as high as seen in previous milling studies which started with higher purity (>20% oil) dry milled germ.

Table 11 summarizes the clean germ protein content (w/w). These results demonstrate that germ protein concentration remains unchanged over time in RT water irregardless of pH. Germ soaked at 60° C. and pH 3 shows decreasing protein content with increasing soak time, but results at pH 6 are inconclusive and vary with time. The addition of enzyme to the soak water also resulted in inconclusive results with respect to final germ protein concentration. For high temperature soak conditions, improved germ oil purities are in part due to soluble nutrient loss such as the leaching of protein over time. Protein loss however, does not solely account for the improvement in oil purity since germ protein decrease is not equal to oil purity improvement. Loss of other water soluble nutrients (eg ash and sugars) likely account for a majority of the remainder of these differences.

TABLE 11

Crude protein results for floating high purity germ material obtained under different soak conditions using the dry frac wet milling system (% dmb)

| Soak time | pH 3 | | pH 6 | | | pH 9 | |
|---|---|---|---|---|---|---|---|
| | RT | 60° C. | RT | 60° C. | 60° C. + enz | RT | 60° C. |
| 0.5 h | 21.0 | 21.1 | 20.6 | 20.5 | 21.1 | 20.7 | 20.5 |
| 2 h | 21.1 | 20.4 | 21.1 | 21.0 | 20.5 | 21.2 | 20.2 |
| 4 h | 20.9 | 19.8 | 21.1 | 20.2 | 21.4 | 21.2 | 19.8 |
| 8 h | 21.5 | 18.9 | 20.8 | 19.5 | 20.2 | 21.6 | 19.8 |

Oil recovery potential (Table 12) attempts to combine results of both germ yield (Table 9) and oil content or purity (Table 10). The total amount of potential oil that can be recovered is determined by multiplying the amount of recovered, clean germ by its purity and dividing this product by the amount of starting material multiplied by its oil concentration.

$$\text{Recovery Potential} = \frac{(\% \text{ protein or oil in clean germ}) \times (\% \text{ recovery})}{\% \text{ initial protein or oil content in germ}}$$

The best potential recovery value would be 100%, meaning all of the oil in the starting dry milled (frac) material was recovered as floating, clean germ at the end of the soak period. This would assume all of the measurable oil is located in the germ tissue. Any number less than 100%, means not all of the high oil germ floated and therefore was not recovered at the end of the soak period. Some oil (eg waxes) however is associated with starch, fiber or tip cap and not contained within the germ and therefore 100% oil recovery is not attainable by only capturing germ tissue. The 8-9 Baumé starch solution used in this trial appears to float germ with an oil purity of at least 30%. The unrecovered germ has lower purity and therefore will not float at 8-9 Baumé regardless of soak water temperature and/or pH. Surprisingly, the highest oil recovery was observed with room temperature soak water at pH 6. It was expected that higher soak water temperatures would have a greater effect on oil purity and thus recovery. Another surprising finding was that with RT soak conditions, oil recovery potential was maximized at 4 hours of soak time and then decreased. At 60° C. and pH 3, total oil recovery potential peaked at 8 hours, but there were only minor differences between pH 6 soak times. There did not appear to be an improvement with enzyme addition to the soak water for oil recovery except for the 8 hour soak treatment. One explanation may be that it takes at least 8 hours for alpha amylase to degrade the starch chains. It may be that higher levels of enzyme are needed for shorter periods of time. Results from Table 17 might suggest this as well since no differences in residual starch were seen between treatments (through 8 hours) with or without enzyme.

TABLE 12

Oil recovery potential (%)

| Soak time | pH 3 | | pH 6 | | | pH 9 | |
| --- | --- | --- | --- | --- | --- | --- | --- |
| | RT | 60° C. | RT | 60° C. | 60° C. + enz | RT | 60° C. |
| 0.5 h | 29.1% | 33.4% | 42.3% | 23.7% | 24.8% | 22.4% | 31.7% |
| 2 h | 33.4% | 35.4% | 55.1% | 26.9% | 19.7% | 48.2% | 24.0% |
| 4 h | 51.1% | 37.1% | 46.8% | 29.3% | 29.4% | 42.6% | 18.0% |
| 8 h | 41.9% | 50.2% | 38.9% | 25.4% | 33.2% | 47.5% | 17.2% |

Overall, RT conditions were best for oil recovery regardless of pH. In terms of protein recovery (Table 13), there was a significant difference between RT and 60° C. that strongly favored RT for germ protein recovery potential. RT protein recovery was strongly influenced by germ yield however enzyme addition to the soak water appeared to have little or no influence on protein recovery potential.

TABLE 13

Protein recovery potential (%)

| Soak time | pH 3 | | pH 6 | | | pH 9 | |
| --- | --- | --- | --- | --- | --- | --- | --- |
| | RT | 60° C. | RT | 60° C. | 60° C. + enz | RT | 60° C. |
| 0.5 h | 20.3% | 21.7% | 29.2% | 15.2% | 16.4% | 16.6% | 19.4% |
| 2 h | 23.7% | 19.9% | 37.1% | 16.7% | 11.9% | 32.0% | 13.5% |
| 4 h | 35.4% | 19.5% | 31.5% | 16.0% | 17.8% | 28.9% | 9.7% |
| 8 h | 28.4% | 24.5% | 25.0% | 13.8% | 17.2% | 30.4% | 9.4% |

Table 12 and 13 suggest that oil and protein recovery results are correlated, showing similar trends when comparing various treatments. It's not necessarily an equal relative change for oil and protein across treatments however. One reason for this difference may be because soak conditions affect protein (and other soluble nutrients in the germ) differently than oil. To better determine the interaction, Table 14 shows the germ protein to oil ratio for floating germ. This ratio is calculated by dividing germ protein concentration by its oil concentration. If no germ protein was lost (and oil is not leached in a 60° C. water soak process), then the protein to oil ratio would be similar before and after the soak process. Before the soak process, the ratio was 0.9, meaning that the initial dry milled germ protein concentration was 90% of the oil concentration.

For all treatments post-soak, protein ratios were significantly below 0.9, which suggests if oil is leaches from germ, protein leaches faster during the soak. There were distinct trends between soak water temperatures and time. With respect to pH for RT conditions, few differences appeared between treatments over time. On the other hand, within a pH treatment, significant differences exist when comparing both soak temperatures at equal soak times. The data suggests that high soak temperature enhances germ protein leaching over time. Therefore, germ protein concentration (at 60° C.) decreases as the soak time increases based on this ratio.

TABLE 14

Protein to oil ratio for floating high purity germ material obtained under different soak conditions using the dry frac wet milling system

| Soak time | pH 3 | | pH 6 | | | pH 9 | |
|---|---|---|---|---|---|---|---|
| | RT | 60° C. | RT | 60° C. | 60° C. + enz | RT | 60° C. |
| 0.5 h | 69.8% | 65.1% | 69.0% | 64.3% | 66.0% | 74.0% | 61.2% |
| 2 h | 70.9% | 56.1% | 67.4% | 62.2% | 60.6% | 66.2% | 56.3% |
| 4 h | 69.3% | 52.7% | 67.3% | 54.7% | 60.5% | 67.9% | 53.9% |
| 8 h | 67.8% | 48.9% | 64.2% | 54.4% | 51.7% | 63.9% | 54.7% |

For starch analysis, the results were very encouraging. Table 17 shows that significant levels of starch are removed from the germ irrespective of soak time. Once separated, the starchy grit fraction is recovered as 'unders'. Due to their density, they sink in Baumé solution, then screened from the solution and sent to fermentation.

Under commercial conditions, 50% of the starting material could be recovered as high purity 'overs' when the oil concentration increases 2-fold (from 15% to 30%). With less than 10% residual starch on the cleaned floating germ (overs) compared to the initial starch content of 33%, more than 80% of the starch from the initial dry milled material is separated or recaptured in the unders fraction.

TABLE 17

Residual starch levels for floating high purity germ material obtained under different soak conditions using the dry frac wet milling system (% dmb)

| Soak time | pH 3 | | pH 6 | | | pH 9 | |
|---|---|---|---|---|---|---|---|
| | RT | 60° C. | RT | 60° C. | 60° C. + enz | RT | 60° C. |
| 0.5 h | 8.69 | 8.26 | 9.45 | 10.05 | 9.85 | 9.43 | 9.36 |
| 2 h | 7.87 | 8.83 | 9.74 | 9.01 | 9.29 | 9.16 | 9.63 |
| 4 h | 8.32 | 10.36 | 9.59 | 10.15 | 10.01 | 9.13 | 9.31 |
| 8 h | 8.40 | 10.78 | 9.08 | 9.86 | 9.69 | 8.88 | 9.67 |

Lastly, some of the more resounding differences in this study occurred with protein dispersibility index (PDI) measurements. The starting material (Table 7) PDI was significantly higher than commercially obtained conventional wet milled germ samples (Table 3). The dry milled germ used in this study had a PDI of 55, where as commercially wet milled germ PDI values are 26 or lower from our independent testing. In general, commercial wet mills soak corn for 20 to 25 hours or more at water temps of 50° C. or more and soak water pH of less than 5. Results from this trial would concur with this in that the longer germ material is soaked in pH 3 conditions at 60° C., PDI scores are lowered precipitously. No other soak condition approached this magnitude of damage to protein solubility from our work. The other interesting detail of this work was that at pH 6 and 9, 60° C. soak temperatures did not have the relative change in ending PDI scores. Thus, there appears to be a significant interaction between soak water pH and temperature for germ PDI where neutral to basic soak conditions have less detrimental affects on final germ PDI scores. On the other hand, RT soak conditions for dry frac germ at pH 3 appear to have minimal affect on its final germ PDI values. In addition, soaking dry frac germ in RT, pH 6 water has no affect on its final PDI values either. The most surprising results of this study are seen with the pH 9 soak treatments. Whereas 60° C. soak conditions can have a negative affect on PDI, no significant affects to germ protein were measured when soaked in pH 9 conditions. When soaked in RT, pH 9 solution, dry frac germ soluble protein levels (PDI) were increased 17 to 29% depending on soak time. The idea here would be a means to improve cereal or oilseed protein solubility through the use of high pH (>7) solvent or soak conditions.

TABLE 18

PDI values for floating, high purity germ material obtained under various soaking conditions using the dry frac wet milling system

| Soak time | pH 3 | | pH 6 | | | pH 9 | |
|---|---|---|---|---|---|---|---|
| | RT | 60° C. | RT | 60° C. | 60° C. + enz | RT | 60° C. |
| 0.5 h | 61.30 | 53.20 | 61.6 | 62.50 | 59.30 | 64.5 | 69.7 |
| 2 h | 52.60 | 27.30 | 62.1 | 43.60 | 52.20 | 69.7 | 60.4 |
| 4 h | 54.40 | 15.60 | 60.9 | 43.00 | 43.1 | 70.9 | 61.1 |
| 8 h | 47.20 | 12.50 | 57.7 | 42.80 | 45.7 | 69.4 | 58 |

In conclusion, the above results indicate that all soaking conditions tested in this dry frac wet milling process result in a commercially desirable low starch, high purity germ product that is ideal for further processing by traditional corn oil processing methods.

Example 3

For this study, two hundred (200) pounds of dry milled germ were purchased. The germ for this trial was the same utilized in Example 2 above. A subsample of the starting material was analyzed with the results shown in Table 19. The oil and starch levels were similar to published values in terms of starch, oil, ash, sucrose and protein concentration. To maintain high PDI values, the corn that was dry milled for this study was allowed to dry down to less than 14% moisture in the field prior to harvesting. In turn, no artificial heat was necessary which could compromise or reduce PDI values.

TABLE 19

Analytical results of the dry milled germ used in Experiment 3 (%, dmb)

| | % | | % |
|---|---|---|---|
| Moisture, lab 1 | 10.2 | Fructose | <0.2 |
| Moisture, lab 2 | 12.3 | Glucose | <0.2 |
| Oil, acid hydrolysis | 26.1 | Sucrose | 10.7 |
| Oil, ether extract | 25.6 | Maltose | <0.2 |
| Starch, Ewers method | 19.5 | Lactose | <0.5 |
| Crude protein | 20.1 | Ash | 7.7 |
| PDI | 57.7 | Phytic acid | 5.8 |
| Crude fiber | 4.6 | | |

Small, recirculating soak tanks having a 2 bushel (112 lb) capacity were used. Since RT water was used for soaking, a larger stainless grind tank was used for soaking the 200 lbs of germ. Material was mixed into six hundred (600) lbs of pH 2.7-4 RT, tap water and allowed to soak for 4.25 hrs after which it was separated from the soak water by the use of a 14 mesh screen. The soak water was then returned to the mixing tank and the screened solids were ground through a Bauer mill at a 0.93 inch gap setting to loosen and removed attached fiber and starch particles. After grinding, materials were recombined with the soak water (Baumé 4 post grind) and then pumped through the 3 inch Dorr Oliver hydroclone. The hydroclone was allowed to run for 15 minutes until it appeared there were no additional materials being captured out of the top as 'overs'. Overs are low density materials which float in medium Baumé water, such as high purity germ and clean fiber and rise out of the top of the hydroclone. The overs were washed, drained and dried at 120° F. for 46 hours to moisture content less than 10%. The denser starch and grit fraction (that sinks in medium Baumé water) drops out of the bottom of the hydroclone (unders), was soaked for an additional 1.5 hours before being ground in the Bauer mill. For this second grind step the Bauer mill gap was reduced to 0.50 inches.

From a previous trial it was known that the standard hydroclone used (large vortex opening) is not able to efficiently separate materials with a high concentration of overs and low unders such as dry milled germ. A smaller vortex opening and a modifiable restriction valve on the bottom opening of the Dorr Oliver hydroclone is better suited to handle new soaking materials such as these. Compared to the original hydroclone, the smaller vortex fills with grit faster which in turn pushes the germ up and out the top of the device to where it can be isolated from the heavier grit material. It appears that this equipment change improved germ yield when compared to the previous trial and leads improved total oil recovery yield. To this point, 98% of the germ was removed after the first grind in this study and the remaining 2% removed after the second grind. Basis analysis of the unders fraction (Table 24), oil levels were lower when compared to the starting material, while overs fraction was significantly higher. This suggests that soak conditions and processing equipment used here were successful in separating high purity germ from grit as well as maintaining a relatively high germ yield, which is important for commercial feasibility.

TABLE 20

Experiment 3 high purity germ recovery yields using dry frac wet milling system (% of start material, dmb).

| | lbs | % |
|---|---|---|
| DM, start | 175.4 | 100 |
| DM, total recovered | 147.1 | 83.5 |
| Aspirated germ | 87.0 | 49.6 |
| Aspirated fiber | 7.6 | 4.3 |
| Unders | 22.6 | 12.9 |
| Soak water, less grits | 29.9 | 17.0 |

Table 20 gives an overview of the separated fractions after being processed with the dry frac wet milling system. One benefit of using dry milled germ is that more than 50% of the total recovered material was high value, high purity germ. To date, dry milled, low purity germ is sold off as a low priced animal feed product and not used as a substrate for value added wet milling processes. To this point, wet milled, high purity germ today has a commercial value of more than $700.00 per ton, while dry milled germ sold as hominy feed to animal feeders may or may not even sell for the original corn price.

It's not entirely clear why the germ yield (Table 21) in this study was higher in comparison to the Example 2 results, which ranged from 8.7 to 26.3% depending on soak conditions. Some possible reasons may be the Bauer mill is more thorough at improving purity by removing bound germ starch particles. Another difference may be that the modified hydroclone is more effective at separating and collecting germ than the floating-scalping method used in the Experiment 2 bench top study. Lab results show that purity was similar to the bench top processing, so it may be that the hydroclone is more efficient at removing germ that may not otherwise float on the surface in high Baumé solution.

When compared to conventional wet milling methods where whole kernel corn is utilized, a 6 to 7% germ yield would be common. Therefore adapting a unique milling system such as the one in this study allows one to utilize dry milled germ as a starting material. For standard wet milling, this is not allowable and therefore differs greatly from the concept demonstrated in this study.

TABLE 21

Experiment 3 chemical results for overs from the dry frac wet milling system (dmb)

| Overs | Overs, non-aspirated, lb | Dry matter % | Germ recovery yld, % | Aspirated germ wt, lb | Aspirated fiber, lb | Fiber, as a percent of overs |
|---|---|---|---|---|---|---|
| Overs, grind 1 | 92.4 | 32.7% | — | 85.3 | 7.1 | — |
| Overs, grind 2 | 2.3 | 27.6% | — | 1.8 | 0.5 | — |
| Overall total | 94.7 | 32.5% | 49.4% | 87.1 | 7.6 | 8.0 |

Once the overs were dried down, clean bran was removed or classified by the use of a Kice aspirator. In this piece of equipment, the germ and fiber material is dropped down a baffled tube under a negative pressure vacuum. The lighter materials such as tip cap and clean fiber are vacuumed up and away to a storage container, while the heavier material like germ drops down the chute into a separate container. Even though little or no fiber seemed present in the dried overs (basis visual inspection), 8% (dmb) of the material was fiber, germ fines and tip cap.

Compared to the first grind, there was significantly less overs material removed by the hydroclone after the second grind. The amount of germ relative to fiber from the second grind overs was lower as well. From this data, the benefits of the second grind with respect to improving germ yield were minimal.

TABLE 22

Experiment 3 chemical results of aspirated germ from the dry frac wet milling process (%, dmb)

|  | % |  | % |
|---|---|---|---|
| Moisture, Dairyland | 5.3 | Fructose | <0.2 |
| Moisture, Eurofins | 7.2 | Glucose | <0.2 |
| Acid hydrolysis oil, | 34.9 | Sucrose | 3.5 |
| Eurofins ether extract | 36.3 | Maltose | <0.2 |
| Ewers starch | 9.4 | Lactose | <0.5 |
| Crude protein | 22.6 | Ash | 7.5 |
| PDI | 48.2 | phytic acid | 5.2 |
| Crude fiber | 5.6 |  |  |

To improve the purity of germ, one of the first materials that one needs to remove is the starch and grit fractions. At the start, the dry frac germ starch levels were almost 20% (dmb). The dry frac wet milling system lowered final germ starch content to 9% (dmb) as seen in Table 22. This is a significant decrease and allows dry fraction ethanol plants the opportunity to recapture valuable starch for fermentation that is otherwise sold as a low-value animal feed ingredient.

Other materials that were leached out of the starting germ material include ash, sucrose and protein (Table 19, 22 and 23). Compared to the starting material, dry frac wet milling improved oil purity by 34%. To increase oil purity further, leaching of internal soluble nutrients (eg protein, ash and sucrose) is necessary. This would need to be conducted under different soak conditions however, which would likely not maximize PDI, but would maximize germ purity. Such conditions are set out below.

Conventional corn wet milling utilizes conditions which maximizes nutrient leaching from the whole, intact kernel into the soak water. In this experiment the goal was to minimize germ protein loss and PDI damage. These differences are more evident when you compare differences between the processed germ in this study (Table 22) and corn germ from conventional wet milled grain (Table 23).

TABLE 23

Analytical survey of corn germ from various processors using conventional wet milling technology (as is, %)..

| Analysis, % | HydroMilling ™ process | Processor A-A | Processor A-4 |
|---|---|---|---|
| Protein | 14.9 | 12.8 | 12.8 |
| Moisture | 5.1 | 4.7 | 4.4 |

TABLE 23-continued

Analytical survey of corn germ from various processors using conventional wet milling technology (as is, %)..

| Analysis, % | HydroMilling ™ process | Processor A-A | Processor A-4 |
|---|---|---|---|
| Oil | 44.5 | 46.4 | 48.4 |
| Starch | 8.8 | 10.8 | 10.2 |
| PDI | 26.3 | 26.0 | 23.5 |

When this system is installed at a dry fraction ethanol plant, the unders (Table 24) would be an excellent substrate for fermentation. As reported, this material is high in starch and low in nonfermentables such as fiber. A portion of the protein in this material is non-protein nitrogen (NPN). Any NPN in this material helps to offset the expense of adding supplemental yeast culturing nutrients during fermentation such as aqueous ammonia or di-ammonium phosphorus (DAP).

TABLE 24

Experiment 3 analytical results of unders from the dry frac wet milling system (%, dmb)

| Moisture, lab 1 | 6.2 | Fructose | <0.2 |
|---|---|---|---|
| Moisture, lab 2 | 7.7 | Glucose | 1.2 |
| Oil, acid hydrolysis | 6.0 | Sucrose | <0.2 |
| Oil, ether extract | 5.4 | Maltose | <0.5 |
| Starch, Ewers | 66.7 | Lactose |  |
| Crude protein | 12.6 | Ash | 2.75 |
| PDI | 15.1 | Phytic acid | 1.25 |
| Crude fiber | 2.17 |  |  |

One interesting note regarding the fiber removed with overs. It appeared to consist primarily of large, flakey particles which were clear, translucent and free of starch (<10%) as shown in Table 25. This suggests that removing adhering starch particles from dry milled bran may not require extensive washing and rinsing processes. In turn, it may be as simple as pulling the cleaned bran off with the germ early in the process and rinsing them together. If this turns out commercially, significant cost savings would be realized since one may not need a separate fiber cleaning system.

The intent of aspirating the germ here and commercially is to further improve purity and produce a high value fiber source for human, pet or animal consumption. Not all of the germ comes out in large pieces however. The Bauer mill grind step breaks some of the germ up into smaller pieces. It is therefore important to optimize the gap setting of the mill so it is not too close and damages the germ yet dislodges any attached starch and fiber. Any tiny pieces of germ that are generated by the Bauer mill have the potential to get pulled off with the fiber during aspiration due to their low weight. Table 25 shows that oil level in the aspirated fiber fraction contains higher than expected amounts of oil and protein. Book values for fiber oil and protein are less than 5 and 9 percent respectively. In the future it may be such that the amount of negative pressure could be reduced which should reduce the amount of germ chips pulled off with the fiber. Other options may include the use of a secondary screening system to remove the small germ pieces from the flakey fiber.

TABLE 25

Experiment 3 analytical results of aspirated fiber from
dry frac wet milling system (%, dmb)

|  | % |
|---|---|
| Moisture, | 8.1 |
| ether extract | 14.7 |
| Ewers starch | 8.1 |
| Crude protein | 14.3 |
| NDF | 55.1 |
| Crude fiber | 13.5 |
| Ash | 3.8 |

After the overs and the unders (grit) are removed from the soak water, what's left is predominantly soluble nutrients such as floury endosperm, germ sugars, ash, small molecular weight proteins, and fine fiber (Table 26). These nutrients contribute to the Baume of the soak water and aid in the separation and lift of germ and flakey fiber in the hydroclone.

The soak water fraction of the germ wet milling will be very valuable to an ethanol producer. Currently in the dry fraction these nutrients are lost when they are sold as hominy feed to the livestock industry. When combined with the unders or grit fraction in Table 24, these two fractions allow the ethanol producer to recapture a significant amount of lost starch, sugars and other fermentable nutrients. For the ethanol producer, it is important to recapture these for fermenting as this will significantly increase overall plant ethanol efficiencies on a per bushel of corn purchased basis.

TABLE 26

Experiment 3 analytics results of soak water, less solids,
from dry frac wet milling system (%, dmb)

|  | % |  | % |
|---|---|---|---|
| Moisture | 90.8 | Fructose | 5.2 |
| Crude protein | 20.4 | Glucose | 6.3 |
| Oil, ether extract | 17.6 | Sucrose | 5.9 |
| Starch, Ewers | 28.3 | Maltose | <0.2 |
| NDF | 5.4 | Lactose | <0.5 |
| Crude fiber | 3.3 | Ash | 14.8 |
|  |  | Phytic acid | 4.1 |

In conclusion, this experiment was able to demonstrate a number of benefits that are lost and unrealized today with dry fraction ethanol production and dry milled corn operations. First, in terms of ethanol production, Table 27 shows the amount of dry frac germ nutrients that can be recaptured by the dry frac wet milling system and ultimately sent to fermentation where they are consumed by the yeast and converted to ethanol or used as growth media. Starch and sugars stand out as high value nutrients which an ethanol producer would want to recapture to increase profitability and higher ethanol conversion efficiency. Any nutrients remaining post fermentation can be sold off as a high protein, low fiber ingredient for use in monogastric nutrition.

TABLE 27

Experiment 3 nutrients removed from dry milled germ by
dry frac wet milling to create high purity germ (dmb)

|  | Lbs lost | Percentage of start material (%) |
|---|---|---|
| Oil | 14.4 | 31.3 |
| Starch | 26.1 | 76.1 |
| Crude fiber | 4.9 | 61.3 |
| Protein | 19.7 | 44.4 |
| Ash | 7.0 | 51.8 |
| Phosphorus | 5.7 | 55.4 |
| Sucrose | 15.9 | 84.1 |

The second benefit of this process is that a novel substrate can be produced that is significantly higher in purity and depending on the processing condition goals, can retain its high PDI value. Both the oil and the protein have greater value in the human food industry. When fractionated off by dry milling processes however, the low purity germ (and bran) is sold at a discount to corn as a livestock ingredient called hominy feed.

The novel, high purity germ produced in this study, was hexane extracted under similar conditions of that used by soybean processors. Dry fractionated germ is very difficult to extract by this process due to its high amounts of free and attached starch. Some oil processors have attempted to use a costly preprocess expander treatment Prior to extraction to minimize this issue since any any loose starch particles from the dry milled germ fouls the hexane solution used to solventize the oil from the germ. Once released from the germ and in solution, the starch plugs up the hexane recirculation system, which in turn reduces oil extraction rates and reactor bed efficiencies. The high purity product produced from our dry frac wet milling system does not have this disadvantage since a majority of the free and attached starch and grit are removed from the starting material. In turn, this improved germ is an excellent substrate for use in any oilseed processing plant.

Another advantage of this new process is that under the proper soaking conditions, much of the original soluble proteins that are present prior to processing are retained in the cleaned germ based on PDI analysis. As discussed earlier, conventional wet milled corn does not have this due to the processing conditions used for soaking. This new process is unique in that it alters the various soak parameters such as soak time, temperature and pH, which in turn, result in a high purity, and if deemed needed, a high PDI product. A corn germ that is more concentrated in protein and high in PDI will have significant value in the human food industry since it can be further processed more easily and cost effectively into new unique products such as corn protein concentrate and corn protein isolate which are not produced today, but could easily be from this new germ product. In addition, an invention such as this improves the overall ethanol efficiency (lbs corn per gallon of ethanol) so that less corn, wheat and barley material will be inefficiently used and reduce the consumption of foodstuffs for fuel and instead converted to high value food ingredients.

REFERENCES

Alexander, R. J., 1987. Corn dry milling: processes, products, and applications. In Corn Chemistry and Technology. S. A. Watson and P. E. Ramstad, Editors. Am. Assoc. Cereal Chemists, St. Paul, Minn.

Burge, R. M., and Duensing, W. J. 1989. Processing and dietary ingredient applications of corn bran. Cereal Foods World 34:535-538.

Corn Refiners Association. Web site: http://www.corn.org/methods/G-28.pdf

Chwalek, V. P., and Olson, R. M. 1980. Combined dry-wet milling processor refining for refining corn. U.S. Pat. No. 4,181,748

Earle, F. R.; Curtis, J. J. and Hubbard, J. E. 1946. Composition of the component parts of the corn kernel. Cereal Chem. 23:504-511.

Feedstuffs. Reference Issue. 2008. The Miller Publishing Company. Minnetonka, Minn.

Freeman, J. E. 1973. Quality factors affecting value of corn for wet milling. Trans. ASAE 16:671-678, 682.

Gillenwater, D. L., Pfundstein, G. B. and Harvery, A. R. 1970. Starch manufacture from corn. U.S. Pat. No. 3,597,274.

Powell, E. L. and McGeorge, G. G. 1975 Process for recovering starch and corn oil from corn. U.S. Pat. No. 3,909,288

Matz, S. A. 1991. 1991. The Chemistry and Technology of Cereals as Food and Feed, $2^{nd}$ ed. Van Nostrand Reinhold, N.Y.

Wang, D. and Eckhoff, S. R. 2000. Effect of broken corn levels on water absorption and steepwater characteristics. Cereal Chem. 77:525-528.

White, P. J. and Johnson, L. A. 2003. Corn: Chemistry and Technology, $2^{nd}$ ed. American Association of Cereal Chemists. St Paul, Minn.

What is claimed is:

1. A method of decreasing starch content of dry milled fractionated tissue of plant seed, the method comprising,
   a) fractionating plant tissue by dry milling fractionation;
   b) separating non-endosperm fractionated tissue from endosperm fractionated tissue;
   c) soaking said non-endosperm fractionated tissue in liquid for less than 20 hours at a temperature of 180° F. or less such that starch is moved from said non-endosperm tissue into said liquid, and said liquid does not thicken such that it prevents flow through any pumps or screens used in said process; and
   d) producing said soaked dry fractionated non-endosperm tissue having starch content less than 14% on a dry matter basis.

2. The method of claim 1, wherein said dry frac wet milling non-endosperm fractionated tissue comprises germ tissue and said germ tissue has a starch content of less than about 12%.

3. The method of claim 1, wherein said dry frac wet milling non-endosperm fractionated tissue comprises germ tissue and said germ tissue has an oil content of at least about 30% on a dry matter basis.

4. The method of claim 1, wherein said dry frac wet milling non-endosperm fractionated tissue comprises pericarp and said pericarp has a starch content of less than about 12% on a dry matter basis.

5. The method of claim 1, comprising soaking said dry non-endosperm fractionated tissue for at least about 30 minutes.

6. The method of claim 1, comprising soaking said dry non-endosperm fractionated tissue for less than 20 hours at a temperature of less than 120° F.

7. The method of claim 1, comprising soaking said dry non-endosperm fractionated tissue for about thirty minutes to about 12 hours.

8. The method of claim 1, comprising soaking said dry non-endosperm fractionated tissue in a liquid that is not heated.

9. The method of claim 1, comprising soaking said dry non-endosperm fractionated tissue at room temperature.

10. The method of claim 1, comprising soaking said dry non-endosperm fractionated tissue in a liquid that is at a temperature of about 33° F. to about 140° F.

11. The method of claim 1, comprising soaking said dry non-endosperm fractionated tissue at a temperature of about 120° F. to 140° F.

12. The method of claim 1, comprising soaking said dry non-endosperm fractionated tissue for less than 15 hours at a temperature of less than 140° F.

13. The method of claim 1, wherein said dry non-endosperm fractionated tissue is soaked for at least 30 minutes to about 12 hours, at a temperature of about 33° F. to about 140° F.

14. The method of claim 13, wherein the tissue is soaked for 8 hours or less at a temperature of about 140° F.

15. The method of claim 13, wherein the tissue is soaked for four hours or less at room temperature.

16. The method of claim 1, further comprising separating said liquid from said dry frac wet milling fractionated non-endosperm tissue and using said separated liquid in a process selected from the group consisting of fermentation, nutrient isolation, purification for a pharmaceutical composition, production of a food product and production of a cosmetic product.

17. The method of claim 1, wherein said dry fractionated tissue comprises germ tissue, and said dry fractionated germ tissue is soaked for at least 30 minutes and less than 20 hours, at a temperature less than 140° F.

18. The method of claim 17, wherein said dry fractionated germ tissue is soaked at a temperature of less than 120° F.

19. The method of claim 1, wherein said dry fractionated tissue comprises germ tissue, and said dry fractionated germ tissue is soaked for less than 15 hours at a temperature of less than 140° F. such that said dry frac wet milling fractionated germ tissue has a protein dispersiblity index (PDI) of at least about 30% and an oil content of at least about 30% on a dry matter basis.

20. The method of claim 19, wherein said dry fractionated germ tissue is soaked for no more than twelve hours.

21. The method of claim 19, wherein said dry fractionated germ tissue is soaked for no more than four hours.

22. The method of claim 19, wherein said dry fractionated germ tissue is soaked in a liquid that is not heated.

23. The method of claim 19, wherein said dry fractionated germ tissue is soaked in a liquid at ambient room temperature.

24. The method of claim 19, wherein said dry fractionated germ tissue is soaked in a liquid at a temperature of less than 120° F.

25. The method of claim 19, wherein said dry fractionated germ tissue is soaked in a liquid from 33° F. to 80° F.

26. The method of claim 19, wherein the pH of said liquid is less than 6.

27. The method of claim 19, wherein the pH of said liquid is 3 to 5.

28. The method of claim 1, wherein said dry fractionated tissue comprises germ tissue and said dry fractionated germ tissue is soaked in a liquid having a pH of at least 9 to produce a dry frac wet milling non-endosperm tissue such that said dry frac wet milling fractionated germ tissue has a higher protein dispersibility index on a dry matter basis after soaking than before soaking.

29. The method of claim 28, wherein said dry fractionated germ tissue is soaked for less than 20 hours.

30. The method of claim 28, wherein said dry fractionated germ tissue is soaked for eight hours or less.

31. The method of claim 28, wherein said dry fractionated germ tissue is soaked for less than four hours.

32. The method of claim 1, wherein said dry non-endosperm fractionated tissue is selected from pericarp and germ.

* * * * *